United States Patent
Marzorati et al.

(10) Patent No.: US 11,927,718 B2
(45) Date of Patent: Mar. 12, 2024

(54) ARTIFICIAL INTELLIGENCE-DRIVEN CARBON DIOXIDE SEQUESTRATION IN THE ATMOSPHERE

(71) Applicant: Kyndryl, Inc., New York, NY (US)

(72) Inventors: Mauro Marzorati, Lutz, FL (US); Jeremy R. Fox, Georgetown, TX (US); Sarbajit K. Rakshit, Kolkata (IN); Ruben Luengas de la Fuente, Madrid (ES)

(73) Assignee: Kyndryl, Inc., New York, NY (US)

( * ) Notice: Subject to any disclaimer, the term of this patent is extended or adjusted under 35 U.S.C. 154(b) by 28 days.

(21) Appl. No.: 17/749,400

(22) Filed: May 20, 2022

(65) Prior Publication Data
US 2023/0375746 A1 Nov. 23, 2023

(51) Int. Cl.
*G01W 1/18* (2006.01)
*B64C 39/02* (2023.01)
*G08G 5/00* (2006.01)
*B64U 101/35* (2023.01)

(52) U.S. Cl.
CPC .............. *G01W 1/18* (2013.01); *B64C 39/024* (2013.01); *G08G 5/003* (2013.01); *B64U 2101/35* (2023.01)

(58) Field of Classification Search
None
See application file for complete search history.

(56) References Cited

U.S. PATENT DOCUMENTS

| 8,211,394 B2 | 7/2012 | Murray et al. |
| 2017/0258320 A1 | 9/2017 | Abreu |

FOREIGN PATENT DOCUMENTS

| CN | 106932543 A | * | 7/2017 | ......... G01N 33/0065 |
| EP | 2438977 | | 8/2014 | |
| KR | 20190020441 | | 3/2019 | |
| KR | 20190029543 | | 3/2019 | |

(Continued)

OTHER PUBLICATIONS

Mell et al., "The NIST Definition of Cloud Computing", NIST, Special Publication 800-145, Sep. 2011, 7 pages.

(Continued)

*Primary Examiner* — Fred Tzeng
(74) *Attorney, Agent, or Firm* — Erik Swanson; Andrew M. Calderon; Calderon Safran & Cole, P.C.

(57) ABSTRACT

Aspects of the present disclosure relate generally to reduction in environmental pollution and, more particularly, to systems and method of carbon dioxide ($CO_2$) sequestration in the atmosphere. For example, a computer-implemented method includes receiving, by a computing device, locations of an atmospheric pollutant; determining, by a computing device, a location of a target area of the atmospheric pollutant for sequestration; determining, by the computing device, positioning and flight path data for airborne sequestration devices to sequester the atmospheric pollutant at the location of the target area of the atmospheric pollutant; and deploying, by the computing device, the airborne sequestration devices with reagent according to the positioning and the flight path data to sequester the atmospheric pollutant at the location of the target area of the atmospheric pollutant.

20 Claims, 8 Drawing Sheets

(56) References Cited

FOREIGN PATENT DOCUMENTS

| | | |
|---|---|---|
| RU | 2461411 | 9/2012 |
| WO | 2020256889 | 12/2020 |

OTHER PUBLICATIONS

Anonymous, "Using Machine Learning Capability to Remove SO2 from Air and Reusing the Same for Manufacturing H2SO4", IP.com No. IPCOM000255966D, Electronic Publication Date: Oct. 26, 2018, 6 pages.

* cited by examiner

```
                    Start
                      │
                      ▼
┌─────────────────────────────────────────────┐
│  Receive the Location of Target Area of     │──── 802
│  Pollutant                                  │
└─────────────────────────────────────────────┘
                      │
                      ▼
┌─────────────────────────────────────────────┐
│  Receive Airflow Direction at the Location  │──── 804
│  of Target Area of Pollutant                │
└─────────────────────────────────────────────┘
                      │
                      ▼
┌─────────────────────────────────────────────┐
│  Determine Future Locations of Target Area  │──── 806
│  of Pollutant                               │
└─────────────────────────────────────────────┘
                      │
                      ▼
┌─────────────────────────────────────────────┐
│  Generate Positioning and Flight Path Data  │──── 808
└─────────────────────────────────────────────┘
                      │
                      ▼
┌─────────────────────────────────────────────┐
│  Send Positioning and Flight Path Data to   │──── 810
│  Airborne Vehicles                          │
└─────────────────────────────────────────────┘
                      │
                      ▼
                    End
```

FIG. 8

ARTIFICIAL INTELLIGENCE-DRIVEN CARBON DIOXIDE SEQUESTRATION IN THE ATMOSPHERE

BACKGROUND

Aspects of the present invention relate generally to reduction in environmental pollution and, more particularly, to systems and method of carbon dioxide ($CO_2$) sequestration in the atmosphere.

The emissions of carbon dioxide ($CO_2$) are a contributor to global climate change. These emissions are generated by normal human activity, industrial processes, the operation of machinery, for example, to generate electricity, movement of people and material from one location to another, and many other sources. Strategies for sequestering carbon from the atmosphere are expected to mitigate the impact of these activities.

SUMMARY

In a first aspect of the invention, there is a computer-implemented method including: receiving, by a computing device, locations of an atmospheric pollutant; determining, by a computing device, a location of a target area of the atmospheric pollutant for sequestration; determining, by the computing device, positioning and flight path data for airborne sequestration devices to sequester the atmospheric pollutant at the location of the target area of the atmospheric pollutant; and deploying, by the computing device, the airborne sequestration devices with reagent according to the positioning and the flight path data to sequester the atmospheric pollutant at the location of the target area of the atmospheric pollutant.

In another aspect of the invention, there is a computer program product including one or more computer readable storage media having program instructions collectively stored on the one or more computer readable storage media. The program instructions are executable to: receive, by a computing device, the location of carbon dioxide emissions; determine, by the computing device, future locations of the carbon dioxide emissions based upon wind speed and wind direction at the location of the carbon dioxide emissions; determine, by the computing device, positioning and flight path data for airborne sequestration devices to sequester the carbon dioxide emissions based upon the location of the carbon dioxide emissions and the future locations of the carbon dioxide emissions; and deploy, by the computing device, the airborne sequestration devices with reagent according to the positioning and the flight path data to sequester the carbon dioxide emissions at the location of the carbon dioxide emissions and the future locations of the carbon dioxide emissions.

In another aspect of the invention, there is a system including a processor, a computer readable memory, one or more computer readable storage media, and program instructions collectively stored on the one or more computer readable storage media, the program instructions executable to: receive, by a computing device, locations of an atmospheric pollutant; rank, by the computing device, the locations of the atmospheric pollutant by a weighted combination of an estimated amount of the atmospheric pollutant, an amount of absorption of the estimated amount of the atmospheric pollutant by available reagents for sequestration of the atmospheric pollutant, and a time to deployment of the airborne sequestration devices to a location of the locations of the atmospheric pollutant; select, by the computing device, a highest ranking location of the target area of the atmospheric pollutant for sequestration; determine, by the computing device, positioning and flight path data for airborne sequestration devices to sequester the atmospheric pollutant based upon the location of the highest ranking location of the target area of the atmospheric pollutant for sequestration and future locations of the target area of the atmospheric pollutant; and deploy, by the computing device, the airborne sequestration devices with reagent according to the positioning and the flight path data to sequester the atmospheric pollutant at the highest ranking location of the target area of the atmospheric pollutant and the future locations of the target area of the atmospheric pollutant.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to reduction of environmental pollution and, more particularly, to systems and method of carbon dioxide ($CO_2$) sequestration in the atmosphere. More specifically, aspects of the invention relate to methods and systems for identifying atmospheric pollutants and positioning reagents in optimal locations to capture and sequester atmospheric pollutants such as $CO_2$ from the atmosphere. An inefficient process occurs during sequestration of pollutants whenever the absorption capacity of reagents is exhausted because chemical reactions stop abruptly. Implementations of the invention predict pollutant concentration and position estimated amounts of reagent for effective absorption of the pollutant. According to aspects of the invention, the methods, systems and program products described herein find and capture pollutants such as $CO_2$ from the atmosphere where it is concentrated, predict the amount of reagent required to sequester the pollutant, deploy airborne vehicles with the reagent to the location of concentrations of the pollutant, and sequester the $CO_2$ to reduce the concentrations of $CO_2$ in the atmosphere.

In embodiments, the methods, systems and program products described herein receive locations of atmospheric pollutants from geographically distributed IoT sensors, news feeds reporting natural disasters, social media feeds sharing social gatherings, and traffic count stations reporting high vehicle volume on highways, among other sources. These locations of atmospheric pollutants are received by an artificial intelligence (AI) pollutant sequester workload operating in a cloud computing environment that determines a location of a target area of the atmospheric pollutant for sequestration. To do so, the AI pollutant sequester workload ranks the locations of the atmospheric pollutant and selects the highest ranking location of the target area of the atmospheric pollutant for sequestration. The AI pollutant sequester workload determines future locations of the target area of the atmospheric pollutant using wind speed and direction at the location of the target area, and generates positioning and flight path data for airborne vehicles laden with reagent to navigate with the airflow path of the atmospheric pollutant for sequestration. The AI pollutant sequester workload also estimates the amount of reagent required to clean the level of the atmospheric pollutant at the location of the target area within a predetermined threshold in embodiments and sends the positioning and flight path data to airborne vehicles with the reagent. During deployment of the airborne vehicles laden with the reagent sequestering the atmospheric pollutant, airborne vehicles without any remaining absorption capacity may be replaced, and the deployment of the airborne vehicles may cease upon determining the level of the atmospheric pollutant is reduced below a predetermined threshold.

Aspects of the present invention are directed to improvements in computer-related technology and existing technological processes in sequestering pollutants. In embodiments, the system including a processor, a computer readable memory, one or more computer readable storage media, and program instructions collectively stored on the one or more computer readable storage media may determine the location of the target area of the atmospheric pollutant for sequestration, generate positioning and flight path data for airborne sequestration devices to sequester the atmospheric pollutant at the location of the target area of the atmospheric pollutant, and deploy the airborne sequestration devices with reagent according to the positioning and the flight path data to sequester the atmospheric pollutant at the location of the target area. These are specific improvements in the way computers may operate and interoperate to detect, locate, equip and deploy sequestration of atmospheric pollutants.

Implementations of the invention describe additional elements that are specific improvements in the way computers may operate and these additional elements provide non-abstract improvements to computer functionality and capabilities. As an example, a computer program product including one or more computer readable storage media having program instructions collectively stored on the one or more computer readable storage media may determine, by the computing device, future locations of the atmospheric pollutant based upon wind speed and wind direction at the location of the atmospheric pollutant. The computer program product may also determine positioning and flight path data for airborne sequestration devices to sequester the atmospheric pollutant based upon the location of the atmospheric pollutant and the future locations of the atmospheric pollutant.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
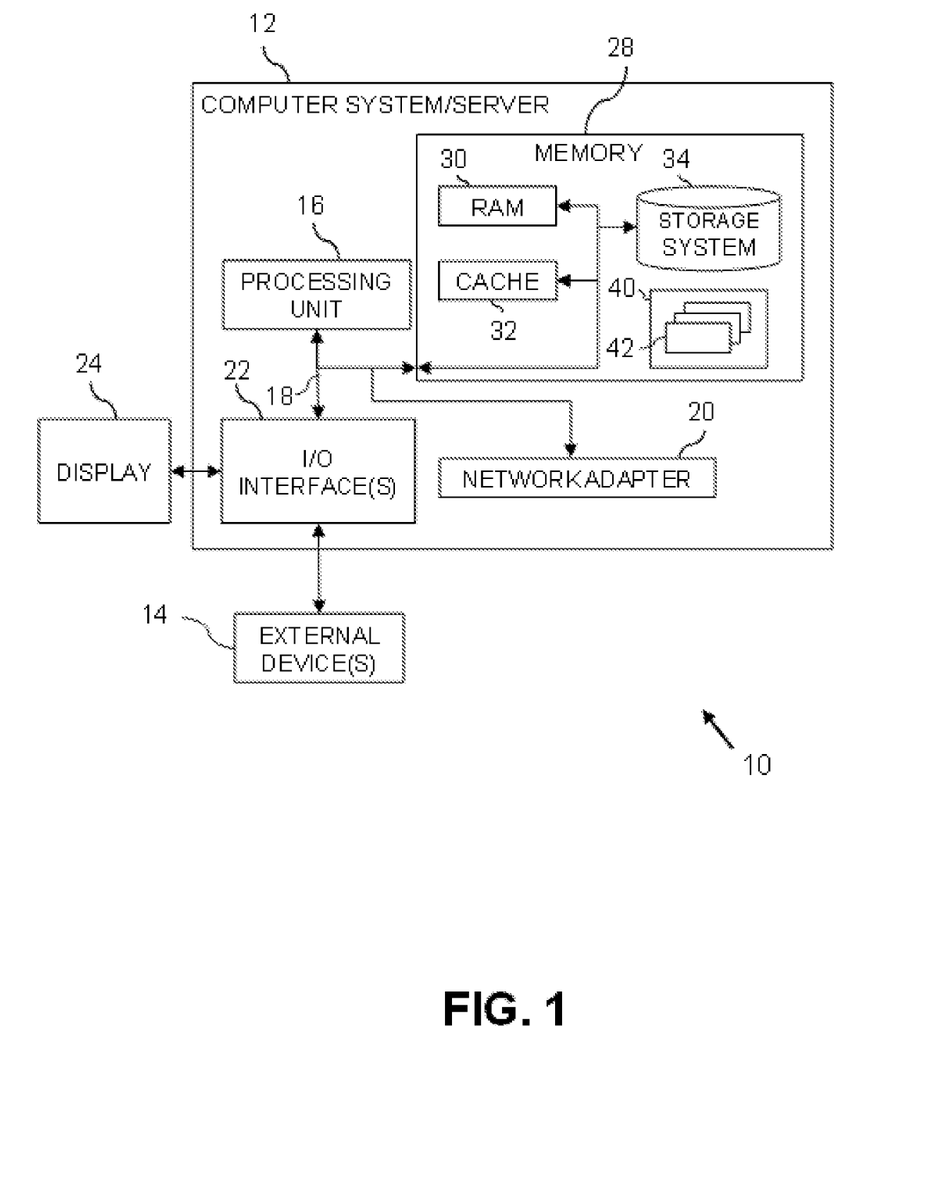
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
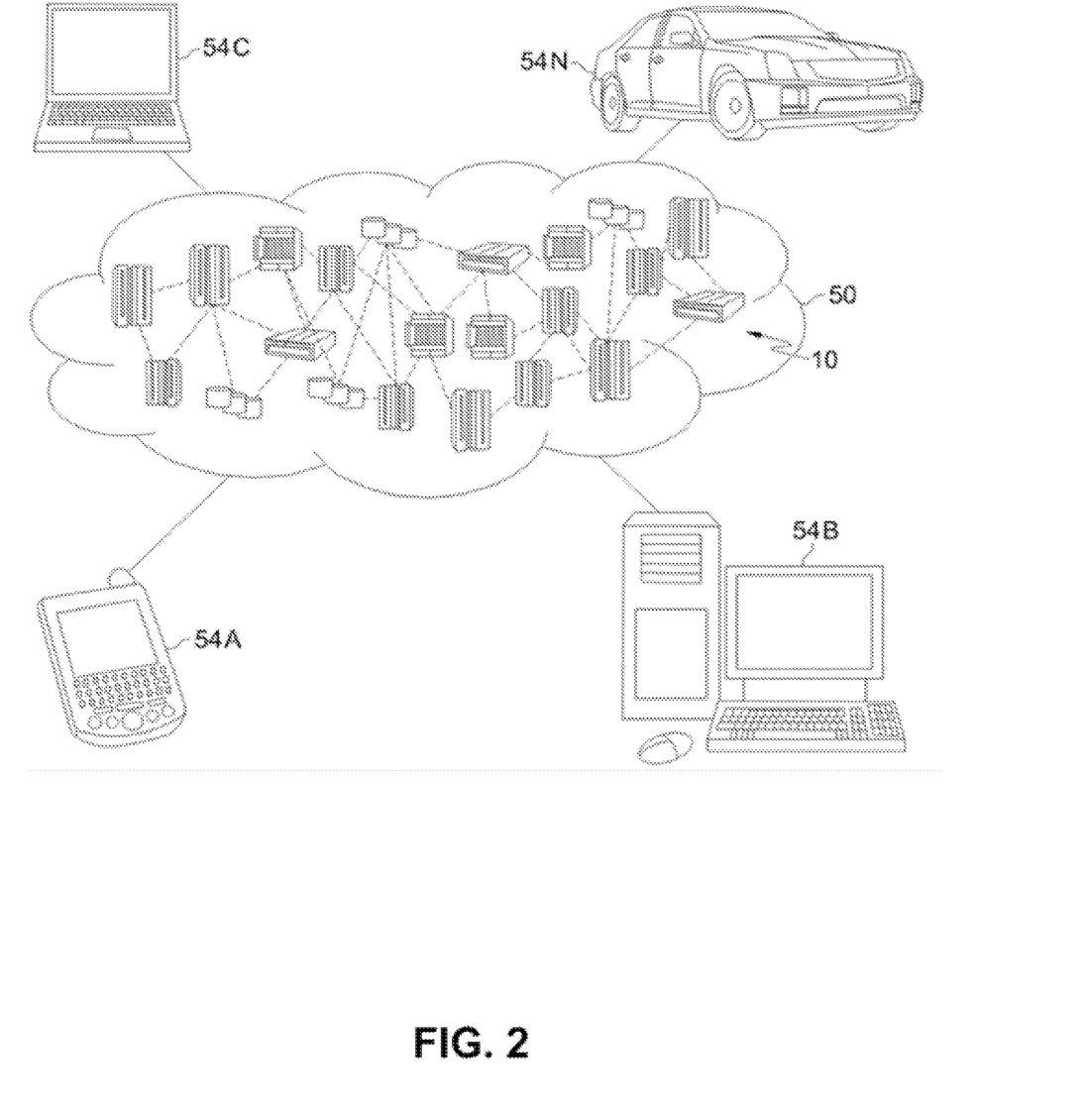
FIG. 2 depicts a cloud computing environment in accordance with aspects of the invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
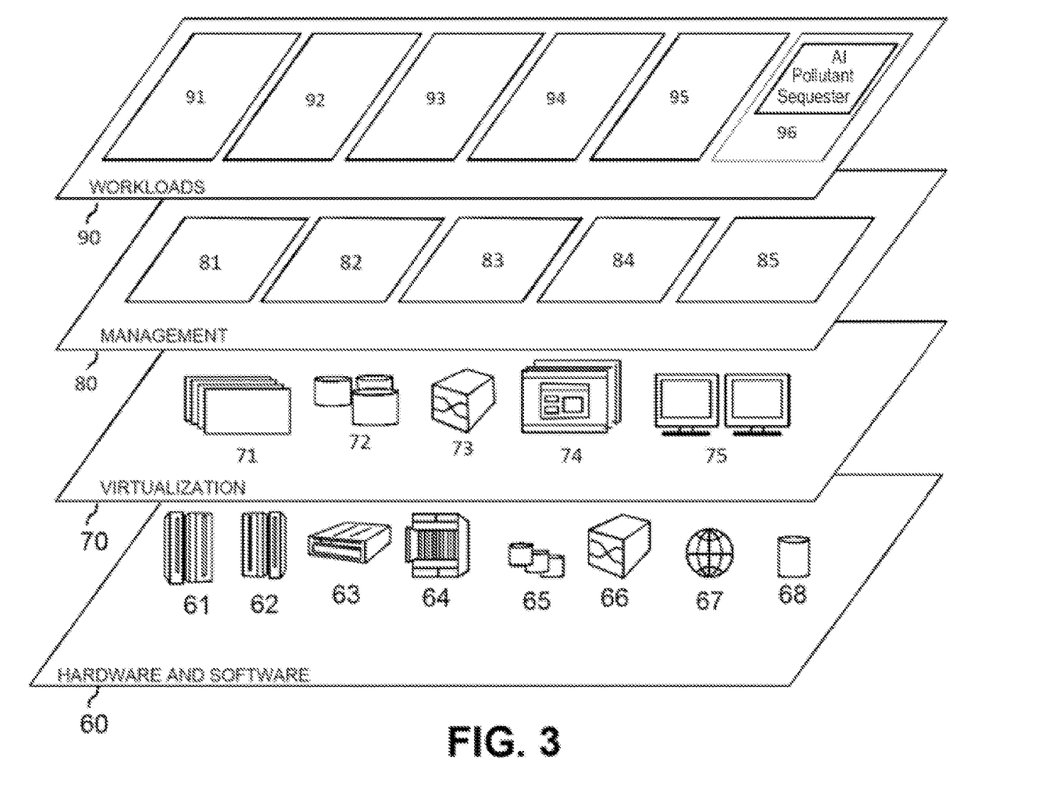
FIG. 3 depicts abstraction model layers in accordance with aspects of the invention.
Figure 4:
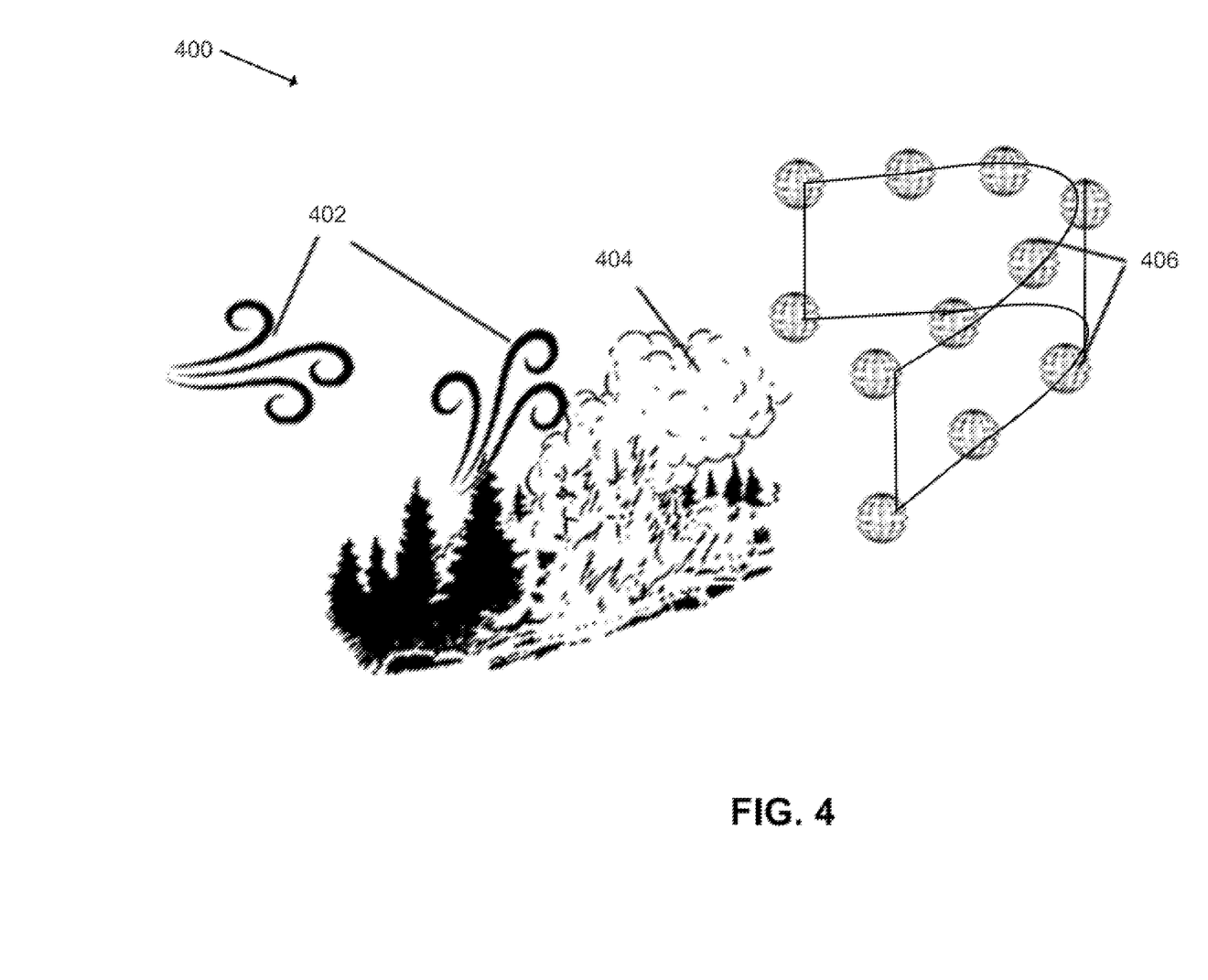
FIG. 4 depicts an illustration of an exemplary environmental application in accordance with aspects of the invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and AI pollutant sequester processing 96.

Implementations of the invention may include a computer system/server 12 of FIG. 1 in which one or more of the program modules 42 are configured to perform (or cause the computer system/server 12 to perform) one of more functions of the AI pollutant sequester processing 96 of FIG. 3. For example, the one or more of the program modules 42 may be configured to receive locations of atmospheric pollutants, determine a location of a target area of the atmospheric pollutant for sequestration, generate positioning and flight path data for airborne sequestration devices laden with reagent to navigate with the airflow path of the atmospheric pollutant for sequestration, and deploy the airborne vehicles laden with the reagent to sequester the atmospheric pollutant as further described herein in more detail.

FIG. 4 depicts an illustration of an exemplary environmental application in accordance with aspects of the invention. In an embodiment, the illustration 400 depicts the occurrence of a natural disaster (e.g., a forest fire), generating a smoke plume of $CO_2$ as shown at reference numeral 404. An air flow direction vector 402 may be determined to predict the actual movement path of the smoke plume of $CO_2$. Global positioning and flight path information may be determined from the predicted actual movement of the smoke plume of $CO_2$ that may be input into auto-piloting modules of airborne absorption vehicles 406 equipped with reagent canisters. To absorb $CO_2$, each reagent canister can carry known reagent material to sequester $CO_2$. The airborne absorption vehicles 406 may then automatically position themselves according to the global positioning and flight path information of the smoke plume of $CO_2$ in a fenced formation to surround the smoke plume of $CO_2$ and sequester the $CO_2$ from the atmosphere with the reagent canisters.

FIG. 5 depicts an illustration of an exemplary process flow diagram in accordance with aspects of the invention. In embodiments, the process flow diagram of FIG. 5 illustrates several sources that provide information to determine a location of a target area of an environmental pollutant to sequester such as $CO_2$. IoT sensors 502 distributed geographically such as at pollution measurement stations may provide pollution information. For instance, IoT sensor 502 that measure $CO_2$ and other pollutants for sequestration may be installed at or near pollution measurement stations that deploy sensors measuring pollutants such as carbon monoxide, nitrogen oxides, ground-level ozone, particle pollution (often referred to as particulate matter), and sulfur oxides. Together these IoT sensors, including the installation of IoT sensors for measuring levels of $CO_2$ and other pollutants for sequestration, create a mesh of sensor arrays geographically dispersed throughout urban and rural areas for tracking and monitoring levels of pollutants for sequestration. The local sensor arrays in the mesh of sensor arrays provide pollution information used to identify a location of a pollutant for sequestration. Thus, through an IoT sensor or using public pollution measurement stations, the $CO_2$ being emitted by any localized device, target area, or process may be measured and retained for $CO_2$ monitoring and data collection.

In addition to pollution information provided by pollution measurement stations, local weather stations provide wind movement information, in particular wind speed and direction, that is useful to predict the actual movement path of the pollutant for sequestration as well as identify the source of the pollutant. The localized wind movement information and the pollution information from local sensor arrays are two sources that provide information to determine a location of a target area of an environmental pollutant to sequester, such as $CO_2$, and to predict the actual movement path of the pollutant for sequestration.

Figure 5:
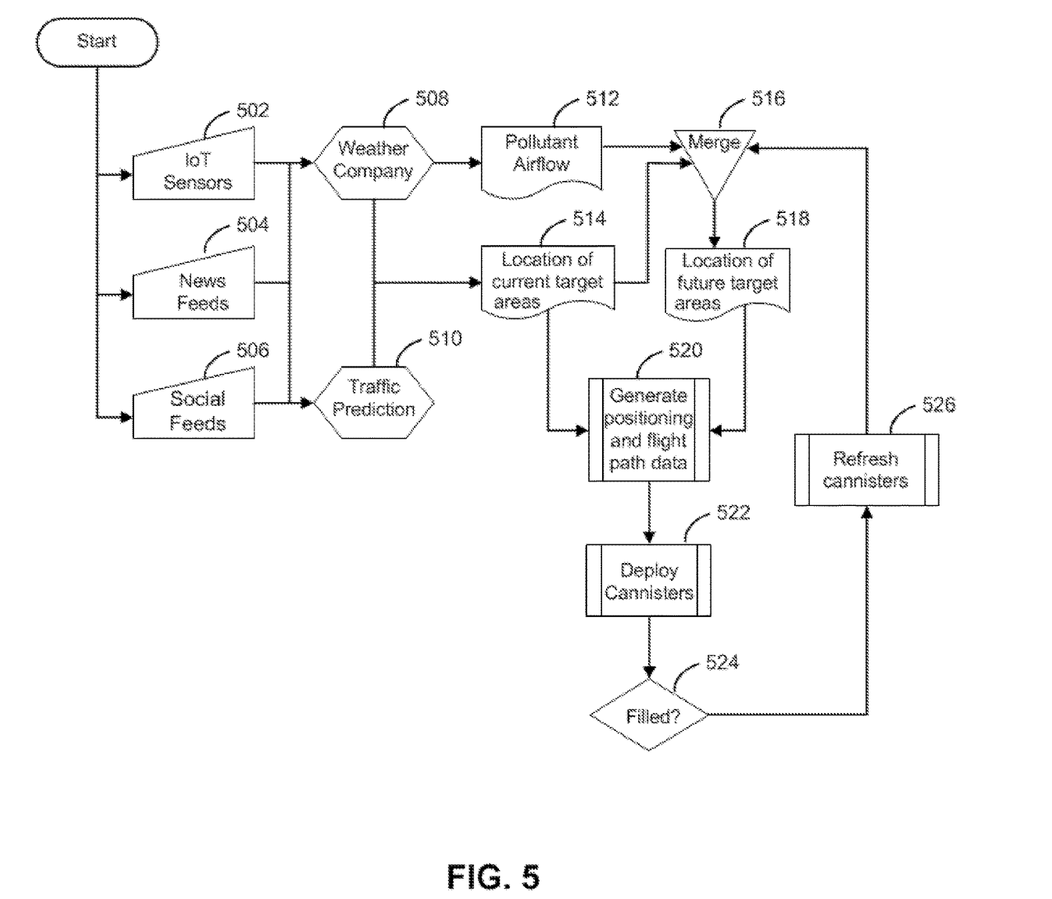
FIG. 5 depicts an illustration of an exemplary process flow diagram in accordance with aspects of the invention.

Other sources of information to determine the location of a target area of an environmental pollutant to sequester include news feeds 504 and social feeds 506. News feeds 504 may provide real-time information of natural disasters occurring such as burning trees, forest fires, volcanoes, earthquakes, and flooding to name a few. These natural disasters can generate vast amounts of pollutants to sequester. Social feeds 506 may provide information of planned social gatherings, events, or crowds of people forming spontaneously. By predicting the number of people at a gathering, the amount of $CO_2$ generate by people can be estimated for the specific location of the gathering for a specific time period. Additionally, the amount of $CO_2$ generated by people in traveling to the specific location of the gathering may also be estimated.

The wind movement information captured by IoT sensors at local weather stations may be streamed to a weather company 508 to validate normal prediction patterns for prevailing winds from the weather company 508 and to add accuracy with real-time data. The wind movement information of wind speed and direction are used to determine the pollutant airflow 512 and the location of the current target areas 514. Traffic prediction 510 may also be streamed to determine the location of the current target areas 514. The traffic prediction may be based on information from traffic monitoring sites.

Information of the location of the current target areas 514 and information of the pollutant airflow 512 may be provided to determine the location of future target areas 518. In turn, information of the location of the current target areas 514 may be provided to the global positioning and flight data processing block that may be used with information of the location of future target areas 518 to determine the positioning and navigation of the airborne sequestration devices.

The global positioning and flight data block 520 generates the positioning and navigation of the airborne sequestration devices along a flight path aligned in speed and direction of the pollutant airflow. To deploy the airborne sequestration devices 522, the information for positioning and navigating the airborne sequestration devices may be applied by the devices for automatically launching, steering and adjusting the location and altitude of airborne devices laden with carbon scrubbing reagents. The airborne devices may be configured in a number of formations for optimizing the absorption capacity of the pollutant targeted. For example, the airborne devices may position themselves in a free floating formation within high concentrations of the pollutant to be sequestered.

In embodiments, one or more of the airborne devices may include a sensor to measure concentrations of the pollutant and the sensor may be operably coupled to the navigation control for positioning the airborne device within high concentrations of the pollutant airflow. Each canister may have a sensor to detect the capacity of absorption of the pollutant by the reagent to determine if there is remaining absorption capacity at decision block 524. In embodiments, it may be determined whether the remaining absorption capacity falls below a predefined threshold based upon any combination of a percentage of total capacity, a discrete amount, a combination of time, material and/or size of reagent, and/or other predetermined values. If the absorption capacity is reached, then the reagent canister may be refreshed at block 526 and redeployed using positioning and flight data based on merging 516 information of the location of the current target areas 514 and information of the pollutant airflow 510 to determine the location of future target areas 518.

This process flow may continue until $CO_2$ levels are lower than another higher-level site based upon an update on new observations of $CO_2$ occurrences. In this way, airborne sequestration devices can be used to effectively move reagent canisters to the location where the reagent canisters need to be at present and/or where the reagent canisters will need to be based on a prediction of the pollutant airflow.

FIGS. 6-8 show flowcharts and/or block diagrams that illustrate the architecture, functionality, and operation of possible implementations of systems, methods, and computer program products according to various embodiments of the present invention. As noted above, each block may represent a module, segment, or portion of instructions, which comprises one or more executable instructions for implementing the specified logical function(s). The functions noted in the blocks may occur out of the order, two blocks shown in succession may, in fact, be accomplished as one step, executed concurrently, substantially concurrently, in a partially or wholly temporally overlapping manner, or the blocks may sometimes be executed in the reverse order, depending upon the functionality involved. And some blocks shown may be executed and other blocks not executed, depending upon the functionality involved.

FIG. 6 shows a flowchart of an exemplary method in accordance with aspects of the present invention. Steps of the method may be carried out in the environment of FIG. 3 and are described with reference to elements depicted in FIG. 3. In particular, the flowchart of FIG. 6 shows an exemplary method for positioning reagent canisters in the optimal location to capture and sequester pollutants such as carbon dioxide from the atmosphere, in accordance with aspects of the present invention.

At step 602, the system determines a location of the target area of the pollutant in an embodiment. Pollution information received from sensors distributed geographically such as at pollution measurement stations, real-time information of natural disasters received from news feeds, information of people gathering in a location received from social media, wind movement information from local weather stations and traffic information received from traffic monitoring sites are analyzed and prioritized to determine the location of the target area of the pollutant. For example, the AI pollutant sequester workload 96 described with respect to FIG. 3 may receive the pollution information, the information of natural disasters, the information of people gathering, the wind movement information, and the traffic information, and determine the location of the target area of the pollutant.

At step 604, the system determines the number of reagent canisters for cleaning the target area of the pollutant. In embodiments, one or more IoT sensors or public pollution measurement stations can measure the pollutant being emitted by any localized device, target area, or process. For instance, IoT sensors that measure $CO_2$ and other pollutants for sequestration installed at or near pollution measurement stations deploy sensors measuring pollutants such as carbon monoxide, nitrogen oxides, ground-level ozone, particle pollution (often referred to as particulate matter), and sulfur oxides. Together these IoT sensors, including the installation of IoT sensors for measuring levels of $CO_2$ and other pollutants for sequestration, create a mesh of sensor arrays geographically dispersed throughout urban and rural areas for measuring and monitoring levels of pollutants for sequestration. The number of reagent canisters may be determined in an embodiment by dividing the amount of the pollutant measured or estimated in the area to be sequestered by the quotient of the amount of reagent required to absorb the amount of the pollutant measured to reduce the concentration level below a specified threshold for the pollutant divided by the amount of reagent a canister carries as follows: amount of pollutant measured/(amount of reagent required/amount of reagent in a canister). In embodiments, the AI pollutant sequester workload 96 described with respect to FIG. 3 may receive measurements of $CO_2$ and other pollutants for sequestration and determine the number of reagent canisters for cleaning the target area of the pollutant.

Figure 6:
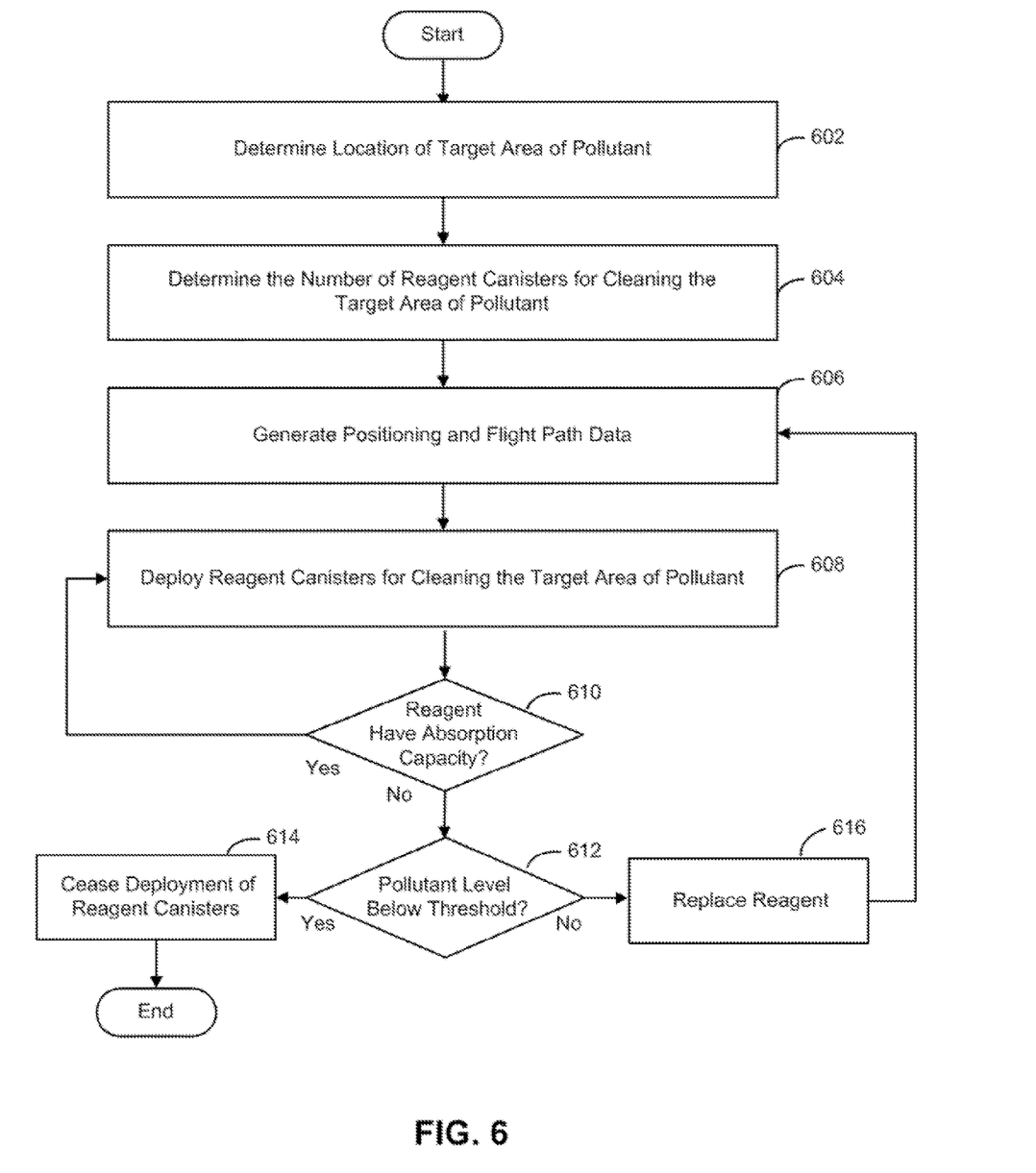
FIG. 6 shows a flowchart of an exemplary method in accordance with aspects of the invention.

At step 606, the system generates positioning and flight path data to align the airborne sequestration devices to navigate along a flight path in the direction of the pollutant airflow. In an embodiment, the information of the pollutant airflow, the location of the target area and the location of the future target area are analyzed to produce flight path data represented by a sequence of triplets including the altitude, GPS coordinates and time, such as (Altitude, GPS coordinates, Time), for navigation of the airborne sequestration device in a flight path of the pollutant airflow. Each airborne sequestration device may be equipped with GPS tracking such as a GPS chip and a navigation module for maintaining the altitude and the position at the time in the sequence of the flight path data. Such airborne sequestration devices may be a navigable aerial balloon, aerial vehicle, or other navigable flight device. In embodiments, the AI pollutant sequester workload 96 described with respect to FIG. 3 may generates positioning and flight path data to align the airborne sequestration devices to navigate along a flight path in the direction of the pollutant airflow.

At step 608, the system deploys the reagent canisters for cleaning the target area of the pollutant in the atmosphere. For example, the AI pollutant sequester workload 96 described with respect to FIG. 3 may deploy airborne sequestration devices carrying the reagent canisters for cleaning the target area of the pollutant in the atmosphere. To deploy the airborne sequestration devices, the information for positioning and navigating the airborne sequestration devices is applied by the devices for automatically launching, steering and adjusting the location and altitude of airborne devices laden with carbon scrubbing reagents. The airborne devices may be configured in a number of formations for optimizing the absorption capacity of the pollutant targeted. For example, the airborne devices may position themselves in a free floating formation within high concentrations of the pollutant to be sequestered. Or the airborne devices may position themselves in a fenced arrangement surrounding the pollutant to be sequestered. In embodiments, one or more of the airborne devices may include a sensor to measure concentrations of the pollutant and the sensor may be operably coupled to the navigation control for maintaining positioning of the airborne device within high concentrations of the pollutant airflow.

At step 610, the system determines whether the remaining absorption capacity of the reagent canisters is below a predefined threshold. In embodiments, each reagent canister may have a sensor to detect the capacity of absorption of the pollutant by the reagent to determine if there is remaining absorption capacity to continue sequestering the pollutant. The system may determine whether the remaining absorption capacity falls below a predefined threshold based upon any combination of a percentage of total capacity, a discrete amount, a combination of time, material and/or size of reagent, and/or other predetermined values. The AI pollutant sequester workload 96 described with respect to FIG. 3 may determine whether the reagent canisters have remaining absorption capacity to continue sequestering the pollutant in an embodiment. If a reagent canister does not have any remaining absorption capacity, the reagent canister may be replaced at step 616. If not, carrying out steps of the exemplary method continue at step 608 and the reagent canister continues to clean the target area of the pollutant in the atmosphere.

At step 612, the system determines whether the concentration of the pollutant in the atmosphere is below a predetermined threshold. In embodiments, each reagent canister may have a sensor to measure the level of the pollutant in the atmosphere. For example, each reagent canister may have a sensor to measure the level of $CO_2$ for sequestering $CO_2$ in the atmosphere. In embodiments, the mesh of sensor arrays geographically dispersed throughout urban and rural areas measure the levels of pollutants for sequestration such as $CO_2$. Upon receiving information of the levels of pollutants measured by the sensors in either embodiment, the AI pollutant sequester workload 96 described with respect to FIG. 3 may determine whether the concentration of the pollutant in the atmosphere is below the predetermined threshold. If the concentration of the pollutant in the atmosphere is below the predetermined threshold, the system ceases deployment of the airborne sequestration devices with the reagent canisters at that location at step 614 and may deploy the airborne sequestration devices at another location of a target area based upon an update of new observations of the occurrence of the pollutant. If not, carrying out steps of the exemplary method continue at step 616 and one or more of the reagent canister are replaced.

At step 616, one or more of the reagent canisters are replaced. In embodiments, one or more of the airborne sequestration devices return to their launch site or other site nearby the location of the current target area and an operator manually replaces the reagent canisters in the airborne sequestration devices. The airborne sequestration devices with replaced canisters are redeployed using positioning and flight data based on the location of the current target areas, information of the pollutant airflow, and the location of future target areas to continue sequestration of the pollutant at the location of the current target area.

Figure 7:
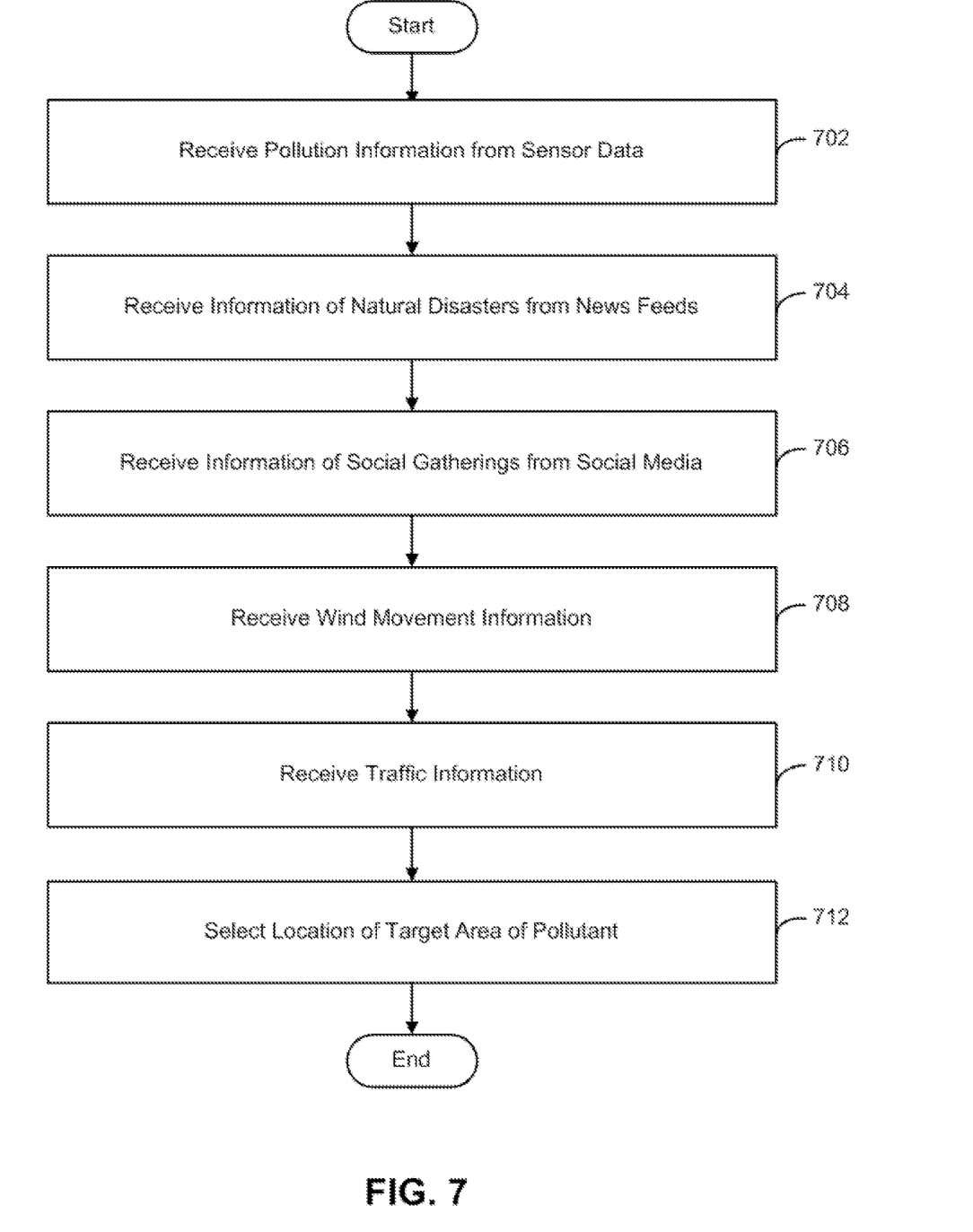
FIG. 7 shows a flowchart of an exemplary method in accordance with aspects of the invention.

FIG. 7 shows a flowchart of an exemplary method in accordance with aspects of the present invention. Steps of the method may be carried out in the environment of FIG. 3 and are described with reference to elements depicted in FIG. 3. In particular, the flowchart of FIG. 7 shows an exemplary method for determining the location of the target area of the atmospheric pollutant for sequestration, in accordance with aspects of the present invention.

At step 702, the system receives pollution information from sensor data provided by IoT sensors distributed geographically such as at pollution measurement stations. For instance, IoT sensors that measure $CO_2$ and other pollutants for sequestration installed at or near pollution measurement stations measure pollutants such as carbon monoxide, nitrogen oxides, ground-level ozone, particle pollution (often referred to as particulate matter), and sulfur oxides. These sensors create a mesh of sensor arrays geographically dispersed throughout urban and rural areas for tracking and monitoring levels of pollutants for sequestration. The local sensor arrays in the mesh of sensor arrays provide measured levels of particular pollutants that are used to identify the location of a pollutant for sequestration. In embodiments, the AI pollutant sequester workload 96 described with respect to FIG. 3 receives pollution information from sensor data.

At step 704, the system receives information from news feeds. News feeds provide real-time information of natural disasters occurring such as burning trees, forest fires, volcanoes, earthquakes, and flooding that generate pollutants. These natural disasters can generate vast amounts of pollutants to sequester, such as $CO_2$ emissions during large-scale wildfires. RSS news feeds, for instance, may be parsed for information reporting natural disasters, and the location, type of disaster, and the geographical area impacted, among other descriptive information, may be extracted from the news stream by the AI pollutant sequester workload 96 described with respect to FIG. 3 for determining the location of high levels of a pollutant such as $CO_2$ for sequestration.

At step 706, the system receives information of social gatherings from social media. Social media feeds as is known in the art, may provide information of planned social gatherings, events, or crowds of people gathering spontaneously. The social media feeds may be analyzed to extract information of planned events including location, number of attendees, type of event and so forth. This information can be extracted from social media feeds by the AI pollutant sequester workload 96 described with respect to FIG. 3 for estimating the amount of $CO_2$ generate by the attendees at the specific location of the gathering for a specific time period. Additionally, the amount of $CO_2$ generated by those attendees in traveling to the specific location of the gathering may also be estimated.

At step 708, the system receives wind movement information including wind speed and direction. For instance, local weather stations provide wind movement information that is useful to predict the actual movement path of the pollutant for sequestration as well as identify the source of the pollutant. The wind movement information captured by IoT sensors at local weather stations may be streamed to a weather company to validate normal prediction patterns for prevailing winds from the weather company and to add accuracy with real-time data. The weather company may stream the wind speed and direction for urban and rural locations to the AI pollutant sequester workload 96 described with respect to FIG. 3 for predicting the actual movement path of an airborne pollutant for sequestration.

And at step 710, the system receives traffic information for predicting motor traffic. For instance, state traffic count stations provide vehicle volume on highways that is useful to predict heavy traffic patterns and congestion that produce pollutants. For example, transportation of people and goods generates a large percentage of $CO_2$ emissions. Traffic information may be streamed to the AI pollutant sequester workload 96 described with respect to FIG. 3 for predicting the time and location of heavy traffic volume and congestion and for estimating the amount of $CO_2$ generated based on the predicted vehicle volume at the location of heavy traffic volume for a specific time period.

At step 712, the system selects the location of the target area of the pollutant to be sequestered. In an embodiment, a list of candidate locations of a target area of a pollutant may be generated from the received pollution information, the information of natural disasters, the information of people gathering, the wind movement information, and the traffic information. Each candidate location of a target area of a pollutant can be ranked by a weighted combination of the estimated amount of the pollutant, the amount of absorption of the estimated amount of pollutant by the available reagent for sequestration of the pollutant, and the time to deployment of the airborne sequestration devices to a particular location. The highest ranking candidate location of the target area of a pollutant is selected in an embodiment. The AI pollutant sequester workload 96 described with respect to FIG. 3 selects the location of the target area of the pollutant to be sequestered.

Figure 8:
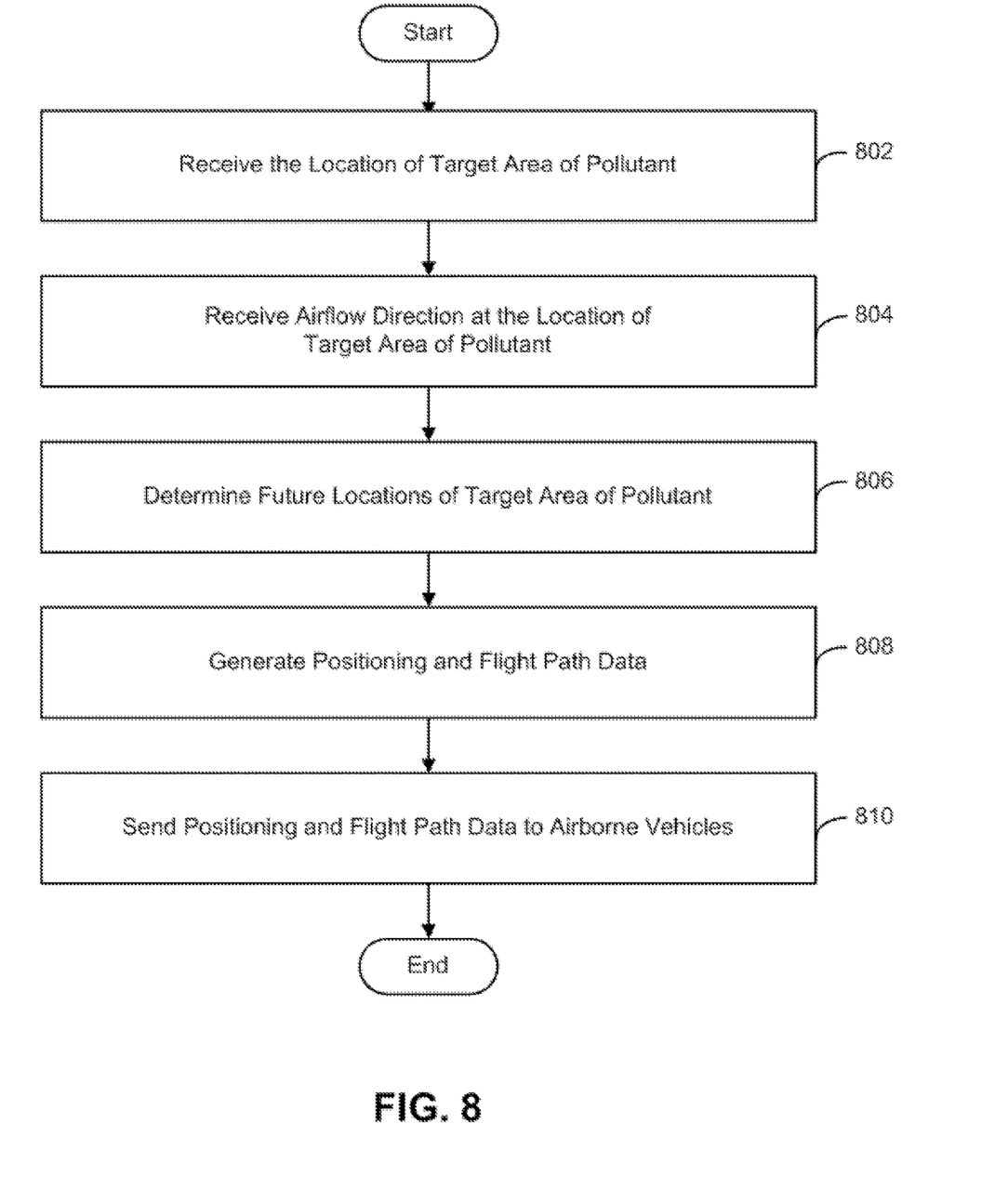
FIG. 8 shows a flowchart of an exemplary method in accordance with aspects of the invention.

FIG. 8 shows a flowchart of an exemplary method in accordance with aspects of the present invention. Steps of the method may be carried out in the environment of FIG. 3 and are described with reference to elements depicted in FIG. 3. In particular, the flowchart of FIG. 8 shows an exemplary method for generating positioning and flight path data at the location of the target area of the environmental pollutant for sequestration, in accordance with aspects of the present invention.

At step 802, the system receives the location of the target area of the pollutant. As described with respect to FIG. 7, the system receives candidate locations of target areas of a pollutant from the received pollution information, the information of natural disasters, the information of people gathering, the wind movement information, and the traffic information, and the system selects the highest ranking candidate location of the target area of the pollutant. For example, the AI pollutant sequester workload 96 described with respect to FIG. 3 analyzes and ranks the candidate locations of target areas of the pollutant by a weighted combination of the estimated amount of the pollutant, the amount of absorption of the estimated amount of pollutant by the available reagent for sequestration of the pollutant, and the time to deployment of the airborne sequestration devices to a particular location, then selects the highest ranking location of the target area of the pollutant.

At step 804, the system receives the airflow direction at the location of the target area of the pollutant. As described with respect to FIG. 7, the system receives wind movement information including wind speed and direction, for instance, from local weather stations to predict the actual movement path of the pollutant for sequestration. In embodiments, the AI pollutant sequester workload 96 described with respect to FIG. 3 receives the wind speed and direction for urban and rural locations for predicting the actual movement path of the airborne pollutant for sequestration.

At step 806, the system determines future locations of the target area of the pollutant based upon the wind speed and wind direction at the location of the target area of the pollutant. The future locations of the target area may be determined at specific GPS coordinates at specific times starting from the GPS coordinates and an initial time of the location of the target area of the pollutant by plotting a flight path at the wind speed and in the direction of the wind in predetermined time increments. In embodiments, the AI pollutant sequester workload 96 described with respect to FIG. 3 determines future locations of the target area of the pollutant by the wind speed and direction at the location for predicting the actual movement path of the airborne pollutant for sequestration.

At step 808, the system generates positioning and flight data to align the airborne sequestration devices to navigate along a flight path in the direction of the pollutant airflow. In an embodiment, the information of the pollutant airflow, the location of the target area and the location of the future target area are used to produce flight path data represented by a sequence of triplets including the altitude, GPS coordinates and time, such as (Altitude, GPS coordinates, Time), for navigation of the airborne sequestration device in a flight path of the pollutant airflow. In embodiments, each airborne sequestration device may be equipped with a GPS tracking device for maintaining the altitude and the position at the time in the sequence of the flight path data. In embodiments, the AI pollutant sequester workload 96 described with respect to FIG. 3 may generates positioning and flight path data to align the airborne sequestration devices to navigate along a flight path in the direction of the pollutant airflow.

At step 810, the system sends the information of positioning and flight path data to the airborne sequestration devices for navigation of the airborne sequestration devices in a formation for absorbing the pollutant targeted and for maintaining positioning of the airborne device within the pollutant airflow. The AI pollutant sequester workload 96 described with respect to FIG. 3 sends the information of positioning and flight path data to the airborne sequestration devices.

In this way, aspects of the present invention find and capture pollutants such as $CO_2$ from the atmosphere where it is concentrated, predict the amount of reagent required to sequester the pollutant, deploys airborne reagent canisters to the location of concentrations of the pollutant, and sequesters the pollutant to reduce the concentrations of the pollutant in the atmosphere.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, by a computing device, locations of an atmospheric pollutant;
   determining, by a computing device, a location of a target area of the atmospheric pollutant for sequestration;
   determining, by the computing device, positioning and flight path data for airborne sequestration devices to sequester the atmospheric pollutant at the location of the target area of the atmospheric pollutant; and
   deploying, by the computing device, the airborne sequestration devices with reagent according to the positioning and the flight path data to sequester the atmospheric pollutant at the location of the target area of the atmospheric pollutant.

2. The method of claim 1, further comprising determining, by the computing device, a number of reagent canisters required to clean the atmospheric pollutant at the location of the target area.

3. The method of claim 1, further comprising:
   receiving, by the computing device, wind speed and wind direction at the location of the target area of the atmospheric pollutant; and
   determining, by the computing device, future locations of the target area of the atmospheric pollutant based upon the wind speed and wind direction at the location of the target area of the atmospheric pollutant.

4. The method of claim 1, further comprising:
   determining, by the computing device, whether remaining absorption capacity of the reagent is below a predefined threshold; and
   replacing the reagent when the remaining absorption capacity is below the predefined threshold.

5. The method of claim 1, further comprising:
   determining, by the computing device, whether the pollutant level at the location of the target area is below a predefined threshold; and
   ceasing, by the computing device, deployment of the airborne sequestration devices when the pollutant level at the location of the target area is below the predefined threshold.

6. The method of claim 1, wherein the determining the location of the target area of the atmospheric pollutant for sequestration comprises:
   generating, by the computing device, a list of candidate locations of target areas of the atmospheric pollutant from the locations of the atmospheric pollutant; and
   selecting, by the computing device, the location of the target area of the atmospheric pollutant for sequestration.

7. The method of claim 1, wherein the determining the location of the target area of the atmospheric pollutant for sequestration comprises ranking, by the computing device, the locations of the atmospheric pollutant by a weighted combination of an estimated amount of the atmospheric pollutant, an amount of absorption of the estimated amount of the atmospheric pollutant by available reagent for sequestration of the atmospheric pollutant, and a time to deployment of the airborne sequestration devices to a location of the locations of the atmospheric pollutant.

8. The method of claim 1, wherein the receiving the locations of the atmospheric pollutant comprises receiving pollutant information from sensor data provided by geographically distributed IoT sensors.

9. The method of claim 1, wherein the receiving the locations of the atmospheric pollutant comprises receiving information of locations of natural disasters from news feeds.

10. The method of claim 1, wherein the receiving the locations of the atmospheric pollutant comprises receiving information of locations of social gatherings from social media feeds.

11. The method of claim 1, wherein the receiving the locations of the atmospheric pollutant comprises receiving information of locations of high vehicle volume on highways.

12. A computer program product comprising one or more computer readable storage media having program instructions collectively stored on the one or more computer readable storage media, the program instructions executable to:
receive, by a computing device, the location of carbon dioxide emissions;
determine, by the computing device, future locations of the carbon dioxide emissions based upon wind speed and wind direction at the location of the carbon dioxide emissions;
determine, by the computing device, positioning and flight path data for airborne sequestration devices to sequester the carbon dioxide emissions based upon the location of the carbon dioxide emissions and the future locations of the carbon dioxide emissions; and
deploy, by the computing device, the airborne sequestration devices with reagent according to the positioning and the flight path data to sequester the carbon dioxide emissions at the location of the carbon dioxide emissions and the future locations of the carbon dioxide emissions.

13. The computer program product of claim 12, wherein the executable instructions are further executable to determine a number of reagent canisters required to clean the carbon dioxide emissions at the location of the carbon dioxide emissions and the future locations of the carbon dioxide emissions.

14. The computer program product of claim 12, wherein the executable instructions are further executable to:
determine whether remaining absorption capacity of the reagent to sequester the carbon dioxide emissions is below a predefined threshold; and
replacing the reagent when the remaining absorption capacity to sequester the carbon dioxide emissions is below the predefined threshold.

15. The computer program product of claim 12, wherein the executable instructions are further executable to:
determine whether the level of carbon dioxide emissions at the location is below a predefined threshold; and
ceasing deployment of the airborne sequestration devices when the level of carbon dioxide emissions is below the predefined threshold.

16. The computer program product of claim 12, wherein the executable instructions to receive the location of carbon dioxide emissions comprises executable instructions to receive the location of the carbon dioxide emissions from news feeds.

17. A system comprising:
a processor, a computer readable memory, one or more computer readable storage media, and program instructions collectively stored on the one or more computer readable storage media, the program instructions executable to:
receive, by a computing device, locations of an atmospheric pollutant;
rank, by the computing device, the locations of the atmospheric pollutant by a weighted combination of an estimated amount of the atmospheric pollutant, an amount of absorption of the estimated amount of the atmospheric pollutant by available reagents for sequestration of the atmospheric pollutant, and a time to deployment of the airborne sequestration devices to a location of the locations of the atmospheric pollutant;
select, by the computing device, a highest ranking location of the target area of the atmospheric pollutant for sequestration;
determine, by the computing device, positioning and flight path data for airborne sequestration devices to sequester the atmospheric pollutant based upon the location of the highest ranking location of the target area of the atmospheric pollutant for sequestration and future locations of the target area of the atmospheric pollutant; and
deploy, by the computing device, the airborne sequestration devices with reagent according to the positioning and the flight path data to sequester the atmospheric pollutant at the highest ranking location of the target area of the atmospheric pollutant and the future locations of the target area of the atmospheric pollutant.

18. The system of claim 17, wherein the program instructions are further executable to determine, by the computing device, a number of reagent canisters to clean the atmospheric pollutant at the location of the target area.

19. The system of claim 17, wherein the program instructions are further executable to:
receive, by the computing device, wind speed and wind direction at the location of the target area of the atmospheric pollutant; and
determine, by the computing device, the future locations of the target area of the atmospheric pollutant based upon the wind speed and wind direction at the location of the target area of the atmospheric pollutant.

20. The system of claim 17, wherein the program instructions are further executable to:
determine, by the computing device, whether remaining absorption capacity of the reagent to sequester the atmospheric pollutant is below a predefined threshold; and
replace the reagent when the remaining absorption capacity to sequester the atmospheric pollutant is below the predefined threshold.

* * * * *